US008136402B2

(12) United States Patent  
Cato

(10) Patent No.: US 8,136,402 B2  
(45) Date of Patent: Mar. 20, 2012

(54) ACCELEROMETER MODULE FOR USE WITH A TOUCH SENSITIVE DEVICE

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 844 days.

(21) Appl. No.: 11/946,521

(22) Filed: Nov. 28, 2007

(65) Prior Publication Data

US 2009/0133499 A1    May 28, 2009

(51) Int. Cl.
*G01P 15/02* (2006.01)

(52) U.S. Cl. ........................... 73/548; 73/514.16

(58) Field of Classification Search ............... 73/514.16, 73/548; 702/141
See application file for complete search history.

(56) References Cited

U.S. PATENT DOCUMENTS

| | | | |
|---|---|---|---|
| 5,801,313 A | 9/1998 | Horibata et al. | |
| 6,160,540 A * | 12/2000 | Fishkin et al. | 345/184 |
| 6,196,067 B1 | 3/2001 | Martin et al. | |
| 6,243,074 B1 * | 6/2001 | Fishkin et al. | 345/156 |
| 6,243,075 B1 * | 6/2001 | Fishkin et al. | 345/156 |
| 6,268,857 B1 * | 7/2001 | Fishkin et al. | 715/863 |
| 6,297,805 B1 * | 10/2001 | Adler et al. | 345/158 |
| 6,297,838 B1 * | 10/2001 | Chang et al. | 715/863 |
| 6,340,957 B1 * | 1/2002 | Adler et al. | 345/1.3 |
| 6,501,529 B1 * | 12/2002 | Kurihara et al. | 349/160 |
| 6,610,917 B2 * | 8/2003 | Ludwig | 84/726 |
| 6,630,922 B2 * | 10/2003 | Fishkin et al. | 345/156 |
| 7,082,578 B1 * | 7/2006 | Fishkin et al. | 715/863 |
| 7,489,303 B1 * | 2/2009 | Pryor | 345/173 |
| 7,649,671 B2 * | 1/2010 | Kothari et al. | 359/291 |
| 2002/0021277 A1 * | 2/2002 | Kramer et al. | 345/156 |
| 2003/0076343 A1 * | 4/2003 | Fishkin et al. | 345/701 |
| 2006/0132433 A1 * | 6/2006 | Kramer et al. | 345/156 |
| 2006/0154216 A1 * | 7/2006 | Hafez et al. | 434/113 |
| 2006/0238517 A1 * | 10/2006 | King et al. | 345/173 |
| 2007/0279729 A1 * | 12/2007 | Kothari et al. | 359/291 |
| 2010/0013775 A1 * | 1/2010 | Son | 345/168 |

FOREIGN PATENT DOCUMENTS

WO   WO 88/04768   6/1998

OTHER PUBLICATIONS

Droge D., Fahey D., Hanna D., Leak D., Mulzet A., White J., Pressure-Sensitive Trackball Device, Oct. 1995, pp. 31-34, vol. 38 No. 10, Charlotte.

* cited by examiner

*Primary Examiner* — Hezron E Williams  
*Assistant Examiner* — Samir M Shah  
(74) *Attorney, Agent, or Firm* — Thomas Tyson; Jeffrey L. Streets

(57) ABSTRACT

An accelerometer module for use with a touch sensor on a device, a method of detecting acceleration using a touch sensor, and a computer program product for receiving the touch sensor data and producing output representative of acceleration. The accelerometer module provides a device with a touch sensor, such as a mobile phone, with the ability to sense acceleration, orientation, or both. The accelerometer module may sense acceleration along a single axis or multiple axis. Sensing acceleration along three axis may be useful for producing a handheld game controller or for providing input to many other applications. The accelerometer module applies a force against a deformable member to change the contact area between the deformable member and the touch sensor, wherein the contact area is a function of the amount of applied acceleration.

6 Claims, 8 Drawing Sheets

ACCELEROMETER MODULE FOR USE WITH A TOUCH SENSITIVE DEVICE

BACKGROUND OF THE INVENTION

1. Field of the Invention

The present invention relates to the use of touch pads and touch screens.

2. Description of the Related Art

An accelerometer is a device for measuring acceleration. Acceleration is the sum total of external forces acting on an object divided by the mass. Accelerometers are perhaps the simplest Micro Electro-Mechanical System (MEMS) device possible, sometimes consisting of little more than a suspended cantilevered beam or proof mass with some type of deflection sensing and circuitry.

Accelerometers can be used to measure vibration on cars, machines, buildings, process control systems and safety installations. They can also be used to measure seismic activity, inclination, machine vibration, dynamic distance and speed with or without the influence of gravity. Applications for accelerometers that measure gravity, wherein an accelerometer is specifically configured for use in gravimetry, are called gravimeters.

Accelerometers are being incorporated into more and more personal electronic devices such as media players and handheld gaming devices. In particular, more and more smartphones (such as Apple's iPhone) are incorporating accelerometers for step counters, user interface control, and switching between portrait and landscape modes.

Accelerometers are used along with gyroscopes in inertial guidance systems, as well as in many other scientific and engineering systems. One of the most common uses for MEMS accelerometers is in airbag deployment systems for modern automobiles. In this case the accelerometers are used to detect the rapid negative acceleration of the vehicle to determine when a collision has occurred and the severity of the collision.

Although accelerometers have found widespread acceptance and utility, the functionality of the accelerometer must be designed and manufactured into the original equipment. There is no existing solution that allows accelerometer functionality to be added to an existing electronic device. It would be desirable to have a module that would provide an existing electronic device with the ability of sensing acceleration. It would be even more desirable if the module was simple, quick to install, and compatible with common portable electronic devices.

SUMMARY OF THE INVENTION

One embodiment of the invention provides an apparatus for sensing acceleration. The apparatus comprises a mobile electronic device having a touch sensitive device, such as a touch pad or touch screen, that provides input to a processor, and a module selectively securable to the mobile electronic device adjacent the touch sensitive device. The module includes one or more acceleration-responsive mechanisms, wherein each acceleration-responsive mechanism has a deformable member that contacts the touch screen over a contact area that varies in response to acceleration. Optionally, the module may include three acceleration-responsive mechanisms, wherein each acceleration-responsive mechanism detects acceleration in a different axis of a Cartesian coordinate system. The deformable member is made of material that can be sensed by the touch device.

Another embodiment of the invention provides a method of sensing acceleration. The method comprises disposing a deformable member adjacent a touch sensitive device surface, directing a force of acceleration to push the deformable member against the touch sensitive device surface to cause elastic deformation of the deformable member, and sensing a change in the contact area between the deformable member and the touch sensitive device as a result of the elastic deformation.

A further embodiment of the invention provides a computer program product embodied on a computer readable medium and providing computer usable instructions for sensing acceleration. The computer program product comprises instructions for detecting a change in the contact area of a first touch sensitive device region associated with acceleration along a first coordinate axis, instructions for detecting a change in the contact area of a second touch sensitive device region associated with acceleration along a second coordinate axis, instructions for detecting a change in the contact area of a third touch sensitive device region associated with acceleration along a third coordinate axis, and instructions for determining an overall acceleration as the combination of the acceleration along the first coordinate axis, acceleration along a second coordinate axis, and acceleration along a third coordinate axis.

Other embodiments, aspects, and advantages of the invention will be apparent from the following description and the appended claims.

DETAILED DESCRIPTION OF PREFERRED EMBODIMENTS

Figure 1:
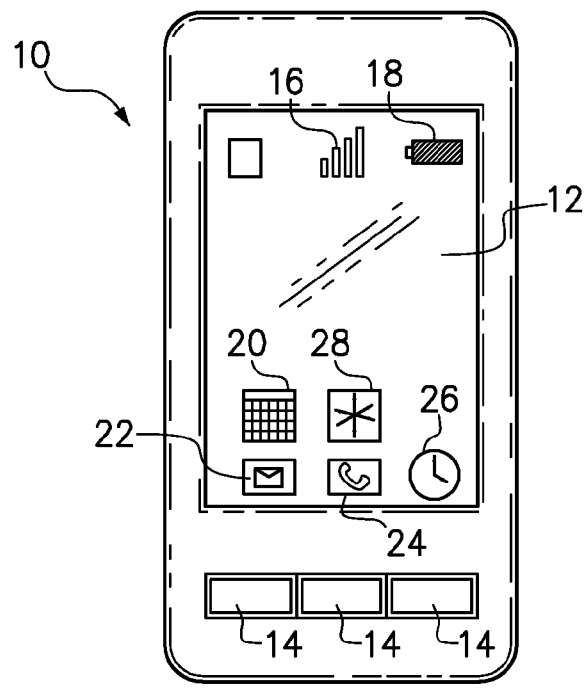
FIG. 1 is a plan view of a mobile phone having a touch screen.

One embodiment of the invention provides an accelerometer module for use with a touch sensitive device, such as a touch pad or touch screen, on a mobile device. The accelerometer module may be used to provide a mobile device having a touch sensitive device with the ability to sense acceleration, orientation, or both. The accelerometer module cooperates with the touch sensitive device to enable the mobile device to sense acceleration along a single axis or dual axis may be useful, for example, for producing a pedometer, automotive vibration sensor, or theft detection device. An accelerometer module that enables the device to sense acceleration along three axis may be useful, for example, for producing a handheld game controller or three-dimensional graphics instrument. A mobile device with the capabilities of an accelerometer may be adapted to many other applications.

Another embodiment of the invention provides a method of detecting acceleration of an accelerometer module in cooperation with a touch device. The accelerometer module applies a force against a deformable member to cause a change in the area of contact between the deformable member and the touch sensitive device. The contact area is a function of the amount of the force applied against the deformable member. Monitoring the touch screen to determine the extent of changes in the contact area of a deformable member enables the amount of the force to be determined. Various mechanisms may be used to deform a deformable member against the touch screen as a result of acceleration in various directions. For example, appropriate use of three independent mechanisms can enable the detection of acceleration along each of three axis. Electronic signals generated by the touch sensitive device may be used separately for various applications or combined to indicate an overall net acceleration of the module.

Yet another embodiment of the invention is a computer readable medium including a computer program product providing computer usable instructions for carrying out a method of detecting acceleration. The computer program product detects the contact area of each of one or more deformable members and uses the detected area to indicate the amount of force applied in a given direction. The amount of the force is generally proportional to the increase in contact area in accordance with a predetermined function that may be empirically determined on the basis of the composition, shape and size of the deformable member. The computer program product may determine the direction of the force in accordance with a predetermined layout of the accelerometer module. The predetermined layout may establish that a particular axial component of the overall acceleration will be indicated by a force on the touch screen in a particular region of the touch screen. Acceleration can then be determined from the force.

A touch sensitive device may be produced using various technologies including, without limitation, a touch sensitive device selected from the group consisting of resistive, surface acoustic wave (SAW), capacitive, infrared, strain gauge, optical imaging, dispersive signal technology, acoustic pulse recognition, and frustrated total internal reflection. However, an embodiment including a capacitive touch sensitive device will be described in greater detail. A capacitive touch sensitive device is known to be capable of simultaneously detecting contact at multiple points on the touch screen, whereas some touch sensitive device technologies are limited to detecting a single point of contact.

A capacitive touch sensitive device panel is coated with a material, typically indium tin oxide, that conducts a continuous electrical current across the sensor. The sensor therefore exhibits a precisely controlled field of stored electrons in both the horizontal and vertical axes and achieves capacitance. The human body is also an electrical device which has stored electrons and therefore also exhibits capacitance. When the sensor's 'normal' capacitance field (its reference state) is altered by another capacitance field, such as a finger, electronic circuits located at each corner of the panel measure the resultant 'distortion' in the sine wave characteristics of the reference field and send the information about the event to the controller for mathematical processing. Capacitive sensors can either be touched with a bare finger or other conductive device, such as the deformable member.

Furthermore, a capacitive touch sensitive device can be made to sense the area of touch as well as the location of the touch on the touch screen. Higher touch pressure causes a finger tip to flatten more and creates a larger tough area. In this manner, the touch sensitive device can determine the relative amount of pressure applied by a finger in proportion to the area touched. An embodiment of the invention includes a deformable member, such as a ball, having a conductive surface for contacting the touch sensitive device in much the same manner as a finger. The deformable member is deformed under a force directed toward the touch sensitive device by a weight that is being accelerated. The deformable member may be any three-dimensional shape that presents a surface at an angle to the touch sensitive device such that the contact area between the surface and the touch sensitive device increases with increasing force or acceleration. For example, the deformable member may have a generally rounded shape such as a sphere, spheroid, or ellipsoid; a shape having a generally rounded face directed toward the touch sensitive device; a generally pyramidal shape; a shape having one or more generally inclined surfaces facing the touch sensitive device. Furthermore, it is not necessary for the deformable member to deform against the flat touch sensitive device surface over a round area. Rather, the deformation may be substantially linear along one or two axis.

The deformable member is disposed between the touch sensitive device and a mechanism for directing a force at the deformable member in a direction toward the touch sensitive device. In one embodiment, the mechanism directs the force at a substantially perpendicular angle relative to a planar touch sensitive device. The mechanism positions a mass in a known relationship to the deformable member. Optionally, the mechanism may be selected to direct a force that represents only a single axial component of the overall acceleration.

A further embodiment includes multiple mechanisms that each direct a force representing a different axial component of an overall acceleration. For example, a set of three mechanisms may be included, where each mechanism directs a force representative of one component of a Cartesian coordinate system. The force measurements from each of the three axis can be utilized separately or in combination to determine the overall acceleration of the device.

A first type of mechanism may allow only forces directed perpendicular to the touch sensitive device (i.e., a "z direction") to be applied against the deformable member. Examples of such mechanisms include a lever having a pivot axis and lever arm that are both substantially parallel to the plane of the touch screen, and a tubular slide extending substantially perpendicular to the plane of the touch screen. A second type of mechanism may allow only forces directed in a first lateral direction parallel to the touch screen (i.e., an "x direction") to be applied against the deformable member. Examples of such mechanisms include a right angle lever arm or a bell crank. If it is desired to measure a component of force in a third direction (i.e., a "y direction"), then another of the second type of mechanism may be disposed at a right angle to measure that force. Other types of mechanisms may be utilized to measure the same or different force components.

The mechanism may be used in conjunction with a biasing member, such as a spring or elastic cord, which limits the range of motion of the mechanism, maintains contact between the mechanism and the deformable member, and maintains contact between the deformable member and the touch screen. Furthermore, a biasing member may apply a sufficient force to partially deform the deformable member, such that touch screen can sense when the force, and therefore the contact area, both increases and decreases. Typically, the spring will have a first end coupled to the lever and a second end coupled to the structure. For example, a coil spring, tension spring, compression spring or wave spring may be utilized. See FIG. 10.

The deformable member must be secured in position between the mechanism and the touch sensitive device. Suitably, the deformable member may be secured to the mechanism, such as at the end of a lever facing the touch sensitive device. The lever is pivotally coupled to a structure and maintains the position of the pivot point of the lever. A mass is secured to, or forms part of, the mechanism.

Each mechanism is secured to a structure that can be selectively coupled to the touch sensitive device or a device providing the touch sensitive device. The structure may, for example, take the form of a housing a frame. The structure may be suitably coupled to the touch sensitive device with a clip, or other fastener.

FIG. 1 is a plan view of a mobile phone 10 having a touch screen 12 and various conventional buttons 14. The touch screen 12 overlays a display that provides a graphical user interface. Depending upon the operating system or software application that control the operation of the display and touch screen, a number of icons are displayed to the user for selecting a desired operation. For example, a typical mobile phone display will provide a signal strength indicator 16, battery charge gauge 18, calendar icon 20, text message icon 22, contacts directory 24, and a clock 26. A special icon 28 may also be provided to facilitate entering an accelerometer mode of operation.

Figure 2:
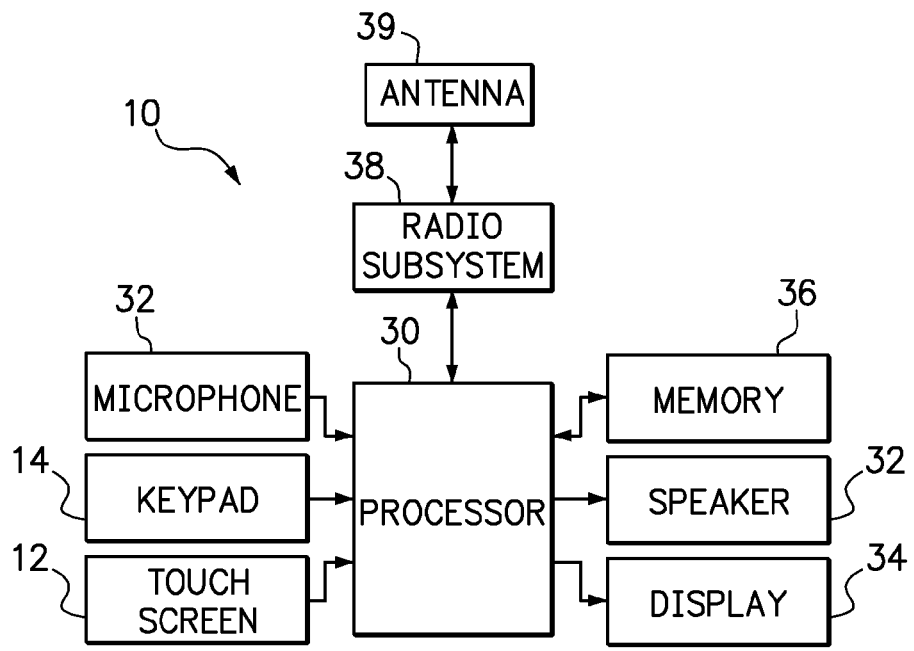
FIG. 2 is a block diagram showing the components of the mobile phone.

FIG. 2 is a block diagram showing the components of the mobile phone 10. The mobile phone 10 includes components for user input to a processor 30, such as a microphone 32, keypad 14 and touch screen 12. User feedback and information is generated by the processor 30 and provided to the user via a speaker 32 and display 34. The processor 30 has access to a memory device 36 that enables storage and retrieval of data. The mobile phone communicates with a wireless telephone network via a radio subsystem 38 coupled to an antenna 39. Note that the block diagram does not include many components or features known in existing mobile phones. Of course, mobile phone 10 could also include any component or feature that is known in the art in addition to those shown within the scope of the preferred embodiments.

Figure 3:
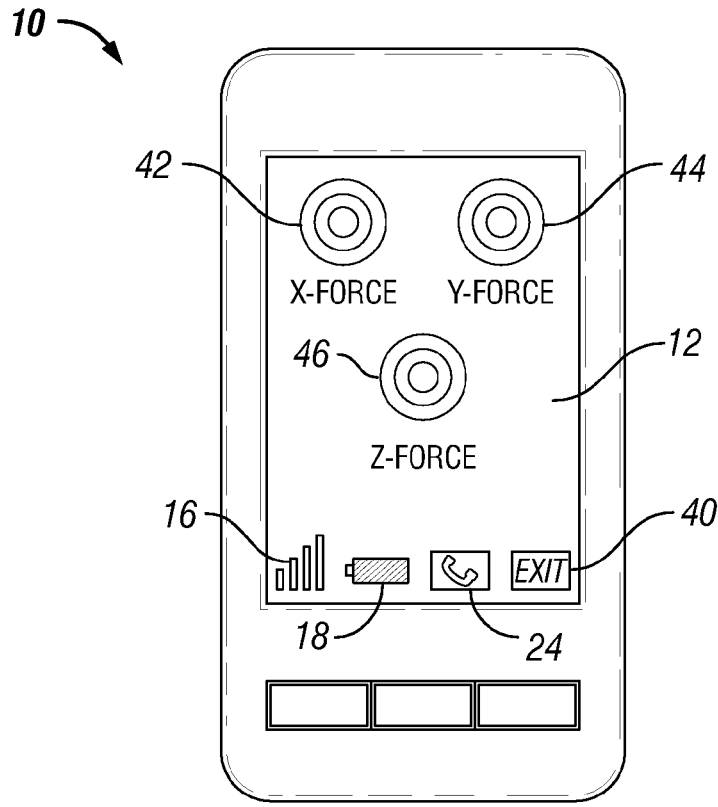
FIG. 3 is plan view of a mobile phone touch screen in accelerometer mode.

FIG. 3 is plan view of a mobile phone 10 having a touch screen 12 in accelerometer mode. Certain high priority information has been moved to the bottom of the touch screen 12, such as the signal strength indicator 16, the battery charge gauge 18, contacts directory 24 and an accelerometer mode exit button 40. An upper portion of the touch screen 12 will be used in cooperation with an accelerometer module to be coupled to the phone 10. As shown, there are three predetermined regions 42, 44, 46 of the touch screen 12 where a deformable member will be positioned to indicate the X component, Y component and Z component of a force, respectively. It is not necessary for these predetermined regions to be displayed to the user, but these regions are shown for purpose of illustration. Rather, this portion of the display might suitably display a message, such as "Please attach accelerometer", or an image illustrating proper attachment of the accelerometer.

Figure 4:
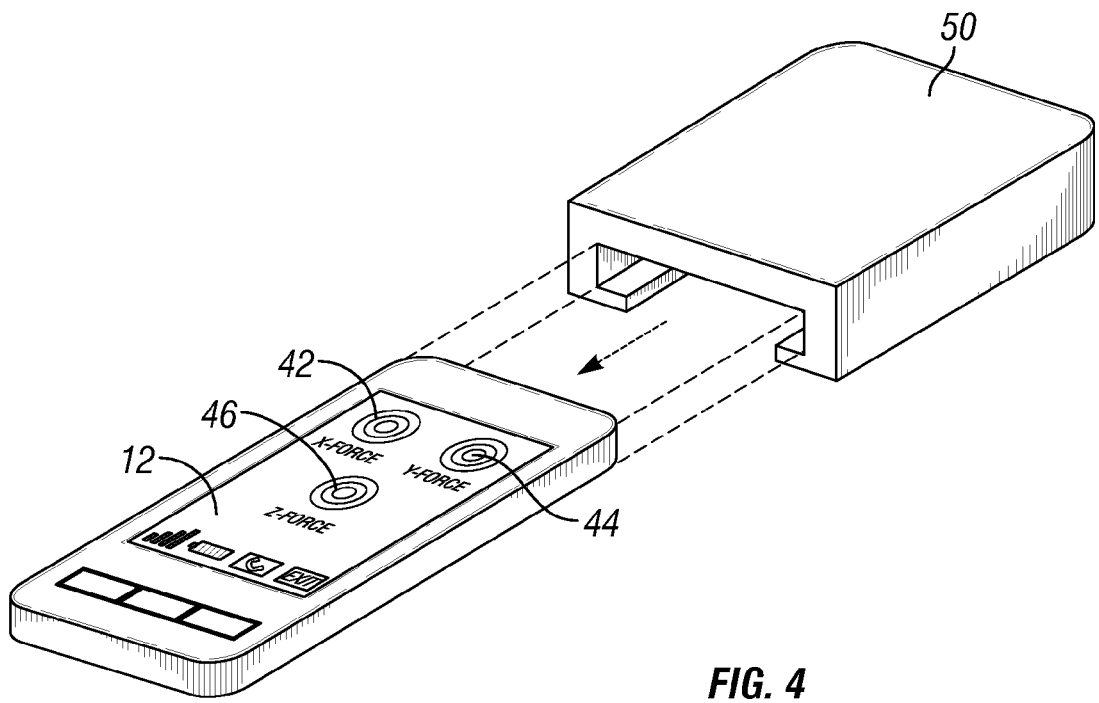
FIG. 4 is a perspective view of an accelerometer module being coupled to the mobile phone.

FIG. 4 is a perspective view of one embodiment of an accelerometer module 50 being coupled to the mobile phone 10. This accelerometer module forms a housing 52 that slides over the upper end of the mobile phone 10.

Figure 5:
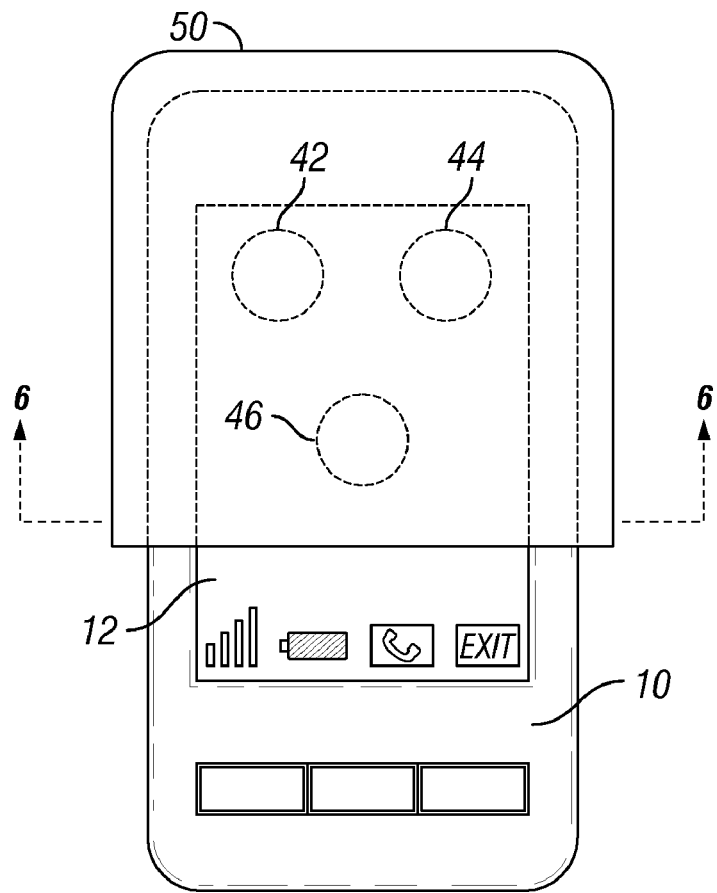
FIG. 5 is a plan view of the accelerometer module coupled to the mobile phone.

FIG. 5 is a plan view of the accelerometer module 50 coupled to the mobile phone 10 in its operative position. As shown, the accelerometer module 50 extends over the three predetermined regions 42, 44, 46 of the touch screen 12. Separate subassemblies of the accelerometer module 50 will cooperate with the predetermined regions 42, 44, 46, as described further in reference to FIG. 6.

Figure 6:
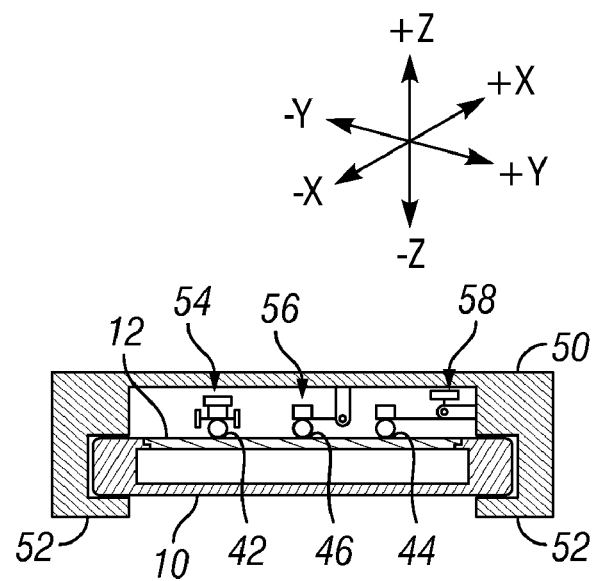
FIG. 6 is a cross-sectional view of the accelerometer module coupled to the mobile phone.

FIG. 6 is a cross-sectional view of the accelerometer module 50 coupled to the mobile phone 10. Optionally, the module 50 forms clips 52 that frictionally engage the perimeter of the mobile phone and secure the module in position. The accelerometer module 50 positions three accelerometer mechanisms over the touch screen 12. Specifically, a first accelerometer mechanism 54 is positioned over the region 42 and senses acceleration in the X direction, a second accelerometer mechanism 56 is positioned over the region 46 and senses acceleration in the Z direction, and a third accelerometer mechanism 58 is positioned over the region 44 and senses acceleration in the Y direction. The operation of the individual mechanisms is described further below.

Figure 7A:
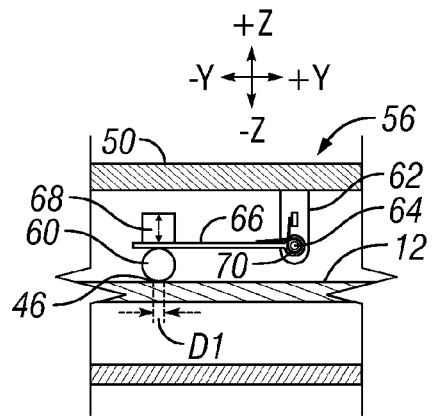
FIGS. 7A-B are partial cross-sectional views of a first mechanism for measuring the force of acceleration in a "Z" direction with a deformable ball in relaxed contact with the touch screen and deformed contact with the touch screen, respectively.
Figure 7B:
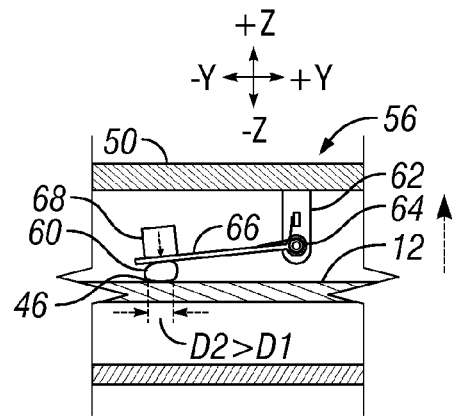

FIGS. 7A-B are partial cross-sectional views of a mechanism 56 for measuring force in a "Z" direction (up and down on the page as shown) with a deformable ball 60. A fixed support bracket 62 extends from the wall and supports a proximal end of the lever 66. The proximal end of the lever 66 includes a pivot pin 64 and a distal end of the lever supports a mass 68. The lever 66 may be long enough that small upward or downward movement the distal end of the lever 66 is nearly perpendicular to the plane of the touch screen 12. Moving the mobile phone 10 and accelerometer module 50 in a "Y" direction (right and left on the page as shown) or in an "X" direction (in and out of the page) will not induce any deformation of the ball 60. Only movement that is substantially vertical with respect to the touch screen will cause deformation of the ball 60. A coil spring 70 is disposed about the pivot axis of the pivot pin 64 and has one leg that biases the lever toward the touch screen by pushing a second leg against a tab on the support bracket 62.

In FIG. 7A, the deformable ball 60 is in relaxed contact with region 46 of the touch screen 12. The relaxed contact produces a contact area having a diameter D1. This contact area is sensed by the touch screen 12 and provides the contact area associated with the region 46 to the processor.

In FIG. 7B, the deformable ball 60 is in deformed contact with the touch screen as a result of vertical movement of the accelerometer module 50. The deformed ball produces a contact area having a diameter D2, wherein deformed diameter D2 (and the deformed contact area) is greater than the relaxed diameter D1 (and the relaxed contact area). The application program or operating system of the mobile phone receives this information and uses the contact area as an indicator of an amount of acceleration being applied in the vertical direction.

Figure 8A:
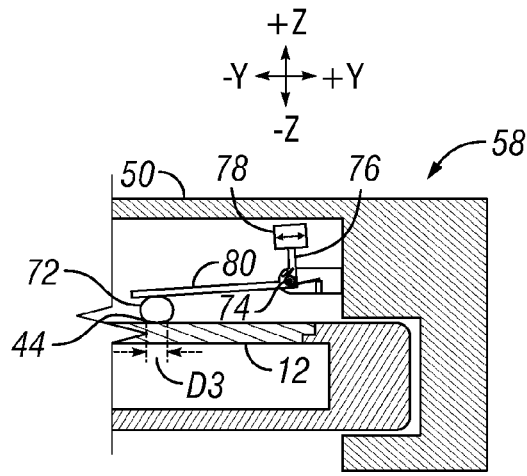
FIGS. 8A-C are partial cross-sectional views of a second mechanism for measuring acceleration in an "X" direction with a deformable ball in slightly deformed contact under a spring force, greatly deformed contact, and in relaxed contact, respectively.
Figure 8B:
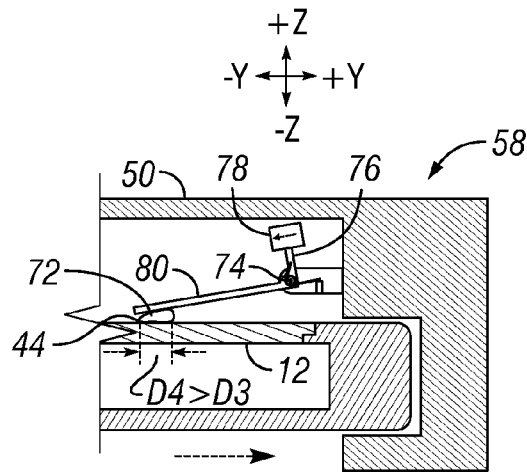
Figure 8C:
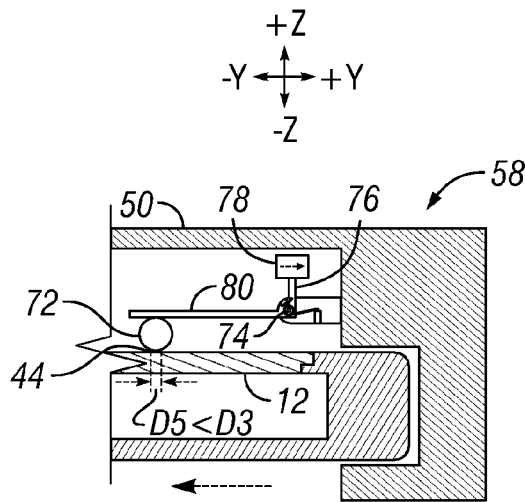

FIGS. 8A-C are partial cross-sectional views of a second mechanism 58 for measuring force in a "Y" direction with a deformable ball 72 in slightly deformed contact with a different region 44 of the touch screen 12 under the force of a spring 74 (FIG. 8A), greatly deformed contact caused by movement of the module 50 to the right (FIG. 8B), and in relaxed contact caused by movement of the module 50 to the left (FIG. 8C), respectively. The second mechanism 58 includes a right-angled or L-shaped lever having a first leg 76 that extends substantially perpendicular to the plane of the touch screen to support a mass 78 and a second leg 80 that extends substantially parallel to the plane of the touch screen. The L-shaped lever pivots about an axis that is parallel to the plane of the touch screen and aligned with the X-axis (in and out of the page). Accordingly, movement of the accelerometer module 50 in the X-direction or the Z-direction will not induce any deformation of the ball 72.

In FIG. 8A, the ball is slightly deformed by the force of the spring 74 to produce a contact area D3. In FIG. 8B, the module 50 is moved to the right resulting in further deformation of the ball 72 and producing a larger contact area D4. In FIG. 8C, the module 50 is moved to the left resulting in less formation of the ball 72 and producing a smaller contact area D5. The application program or operating system of the mobile phone receives this information and uses the contact area as an indicator of an amount of acceleration being applied in the Y-direction. Unlike the mechanism 56 of FIGS. 7A-B which could only detect one direction of movement along an axis (i.e., upward movement in the +Z direction), the mechanism 58 of FIGS. 8A-C provides sufficient information to sense movement two directions along an axis. Movement to the right (i.e., in the +Y direction) causes a contact area that is greater than the contact area when the accelerometer is stationary. Movement to the left (i.e., in the −Y direction) causes a contact area that is less than the contact area when the accelerometer is stationary. The degree of movement or acceleration may be determined as well as the direction, because the degree of increase or decrease in the contact area in sensed by the touch screen and provided to the processor. It should be recognized that the first mechanism 56 may also be implemented to detect movement in two directions by increasing the force of the spring 70.

It should also be recognized that a third mechanism 54 (as shown in FIG. 6) may be provided in the same manner as the second mechanism 58, except that it is secured to the module at a right angle to the second mechanism 58. Specifically, the third mechanism 54 has a pivot axis that is parallel with the Y-axis such that it only senses movement in the X-direction. Furthermore, the third mechanism 54 makes contact with the touch screen 12 in a different predetermined region 42 so that the processor can determine whether the force is attributable to the X, Y or Z axis.

Figure 9A:
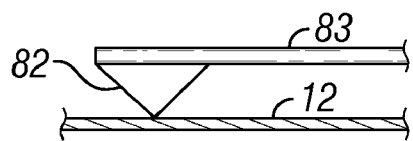
FIGS. 9A-D are side views of deformable members that would provide different relationships between acceleration and contact area.
Figure 9B:
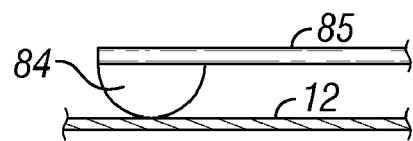
Figure 9C:
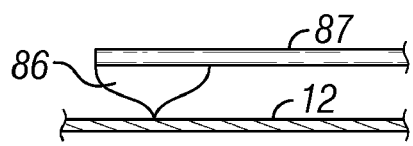
Figure 9D:
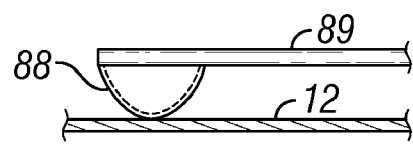

FIGS. 9A-D are side views of deformable members that would provide different relationships between force and contact area, regardless of the type of mechanism or axial component of force being sensed. In FIG. 9A, a triangular or pyramidal member 82 is mounted to a lever 83 and presents a point or vertex onto the touch screen 12. The vertex would be expected to initially produce a very small contact area and require less force to deform than a sphere. In FIG. 9B, a spherical section 84 is coupled to a lever 85 and presents a spherical surface against the touch screen 12. The spherical section 84 should produce a similar relationship between force and contact area as a complete sphere, but will require less space because it is thinner and will require less angular displacement of the lever. In FIG. 9C, an irregularly shaped member 86 is coupled to a lever 87 and illustrates that, for any given material, a profile may be modified to produce a desired relationship between force and contact area. In FIG. 9D, a hollow member 88 is coupled to a lever 89, where making the member hollow may result in a greater contact area during deformation since there is no internal material to compress or stretch. Such a hollow member may be perforated or air tight.

Figure 10:
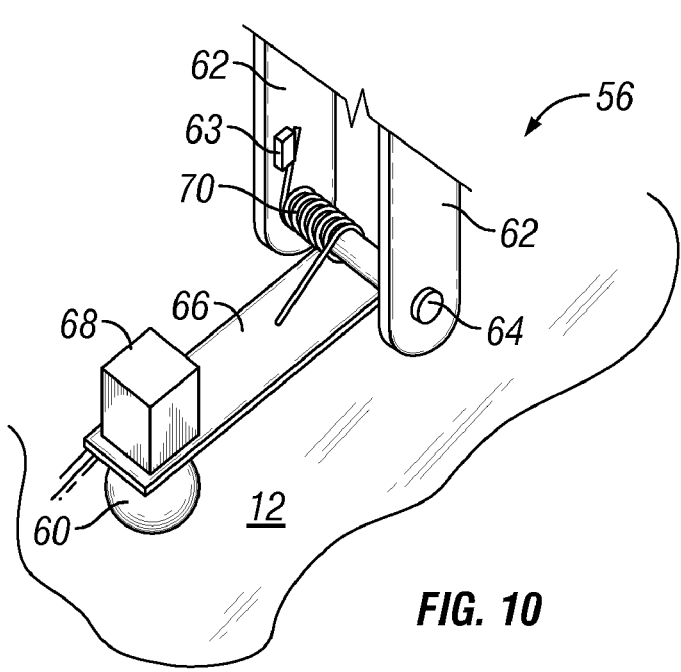
FIG. 10 is a partial perspective view showing a spring that biases a lever to prevent loose swinging of the lever and maintain contact between the deformable member and the touch screen.

FIG. 10 is a partial perspective view of the first mechanism 56 with a coil spring 70 that biases the lever 66 toward the touch screen 12 to prevent loose swinging of the lever and maintain contact between the deformable member 60 and the touch screen 12. As previously discussed, embodiments of the spring 70 may partially deform the member 60 to enable detection of both upward movement via increases in contact area and downward movements via decreases in contact area. The coil spring 70 will typically have one or more turns or coils and two legs that project outward to engage the lever 66 and the support bracket 62, such as against a tab 63.

Figure 11A:
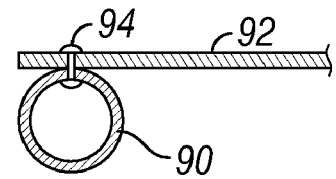
FIGS. 11A-B are partial cross-sectional views showing potential attachment of a deformable member to a lever.
Figure 11B:
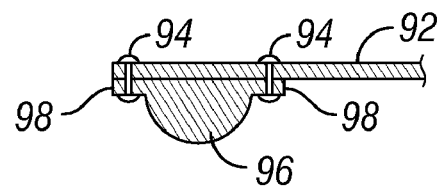

FIGS. 11A-B are partial cross-sectional views showing potential attachment of a deformable member to a lever. In FIG. 11A, a deformable member 90 takes the shape of a hollow sphere and is coupled to the lever 92 by a rivet or other fastener 94. In FIG. 11B, a spherical section 96 includes tabs 98 for coupling to the lever with rivets or other fasteners 94. It should also be recognized that the deformable members may be secured using adhesives or other attachment means.

Figure 12A:
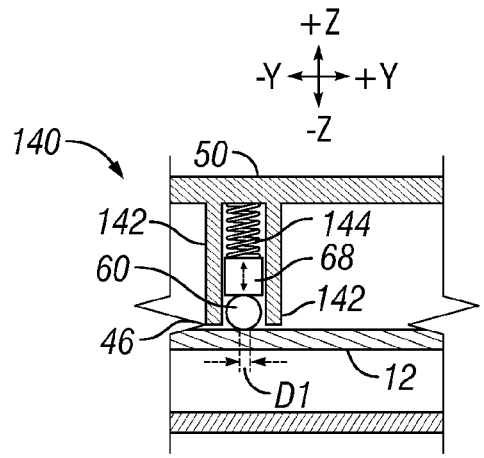
FIGS. 12A-B are partial cross-sectional views of a third mechanism for measuring the force of acceleration in a "Z" direction with a deformable ball in relaxed contact with the touch screen and deformed contact with the touch screen, respectively.
Figure 12B:
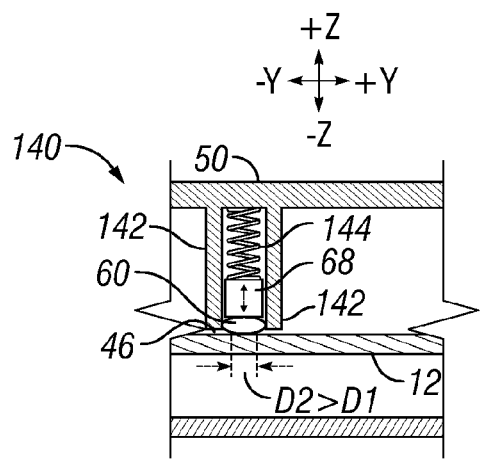
Figure 12C:
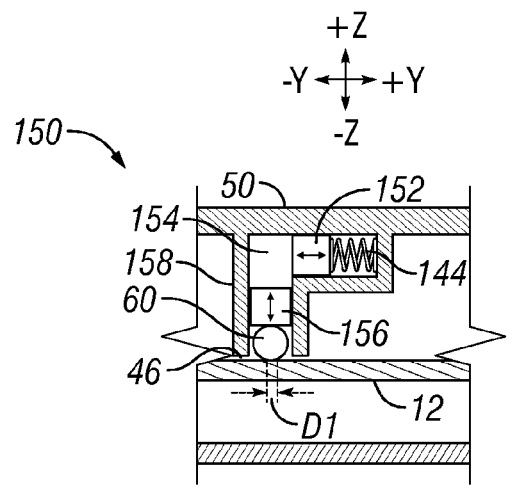
FIG. 12C is a partial cross-sectional view of a fourth mechanism for measuring the force of acceleration in a "Y" direction with a deformable ball in relaxed contact with the touch screen. This mechanism utilizes fluid to convert motion in the "Y" direction to that in the "Z" direction to enable it to be sensed.

FIGS. 12A-C are partial cross-sectional views of embodiments using a tubular or cylindrical chamber to hold the deformable member, mass, and spring in a manner so that acceleration in a particular direction causes deformation against the touch sensitive device. In FIG. 12A, the module 50 includes a mechanism 140 forming a tubular chamber defined by walls 142. The chamber walls 142 secure the deformable member 60, the mass 68, and a spring 144 in alignment. Accordingly, acceleration of the module in the +Z direction (upward on the page) will cause deformation of the member 60 against the touch screen 12, as shown in FIG. 12B. As in other embodiments, the spring may simply secure the mass 68 against the deformable member 60 such that deformation indicates acceleration in the +Z direction, or the spring may normally cause a first degree of deformation in order to indicate acceleration in the +Z direction by an increase in deformation and indicate acceleration in the −Z direction by a decrease in deformation.

FIG. 12C is a partial cross-sectional view of an embodiment for detecting acceleration in the +Y or −Y direction (as shown) or even in the +X or −X direction by orienting the mechanism at 90 degrees. Whereas the mechanisms of FIGS. 8A-C use a pivot to convert a force parallel to the touch sensitive device to a force perpendicular to the touch sensitive device, this mechanism 150 uses a fluid in the tubular chamber to enable the direction of the force to be changed as desired. Accordingly, acceleration of the module 50 in the +Y direction (to the right of the page) causes a high mass hydraulic piston 152 to move to the left, pushing the fluid 154 against the low mass piston 156, which in turn deforms the member 60 against the touch screen 12. The hydraulic tube is bent 90 degrees so that movement of the higher mass piston 152 in a direction parallel to the plane of the touch sensitive device 12 is converted to movement of the low mass piston 156 perpendicular to the touch sensitive device 12. Optionally, the low mass piston could be replaced with a membrane or bellows to cover the end of the tube 158 and contain the fluid 154. Hydraulic pressure would deform the membrane or bellows. This would enable the membrane or bellows to also function as the deformable member 60. Again, the spring may be used to deform the member 60 so that acceleration in both the +Y and −Y direction (or both the +X and −X direction) can be detected by sensing an increase or decrease in deformation.

Figure 13A:
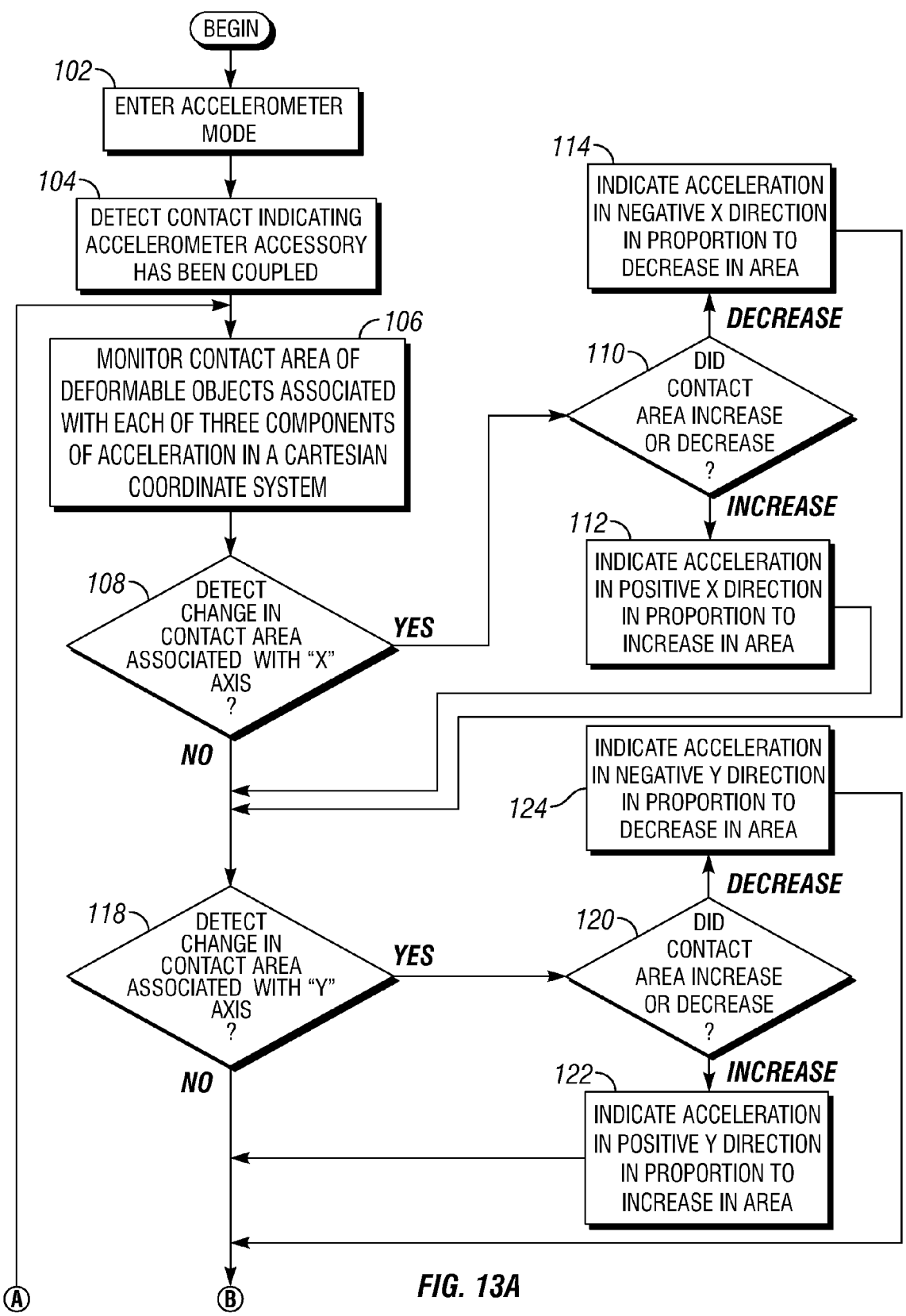
FIGS. 13A-B provide a flow diagram of a method for detecting acceleration of the accelerometer module.
Figure 13B:
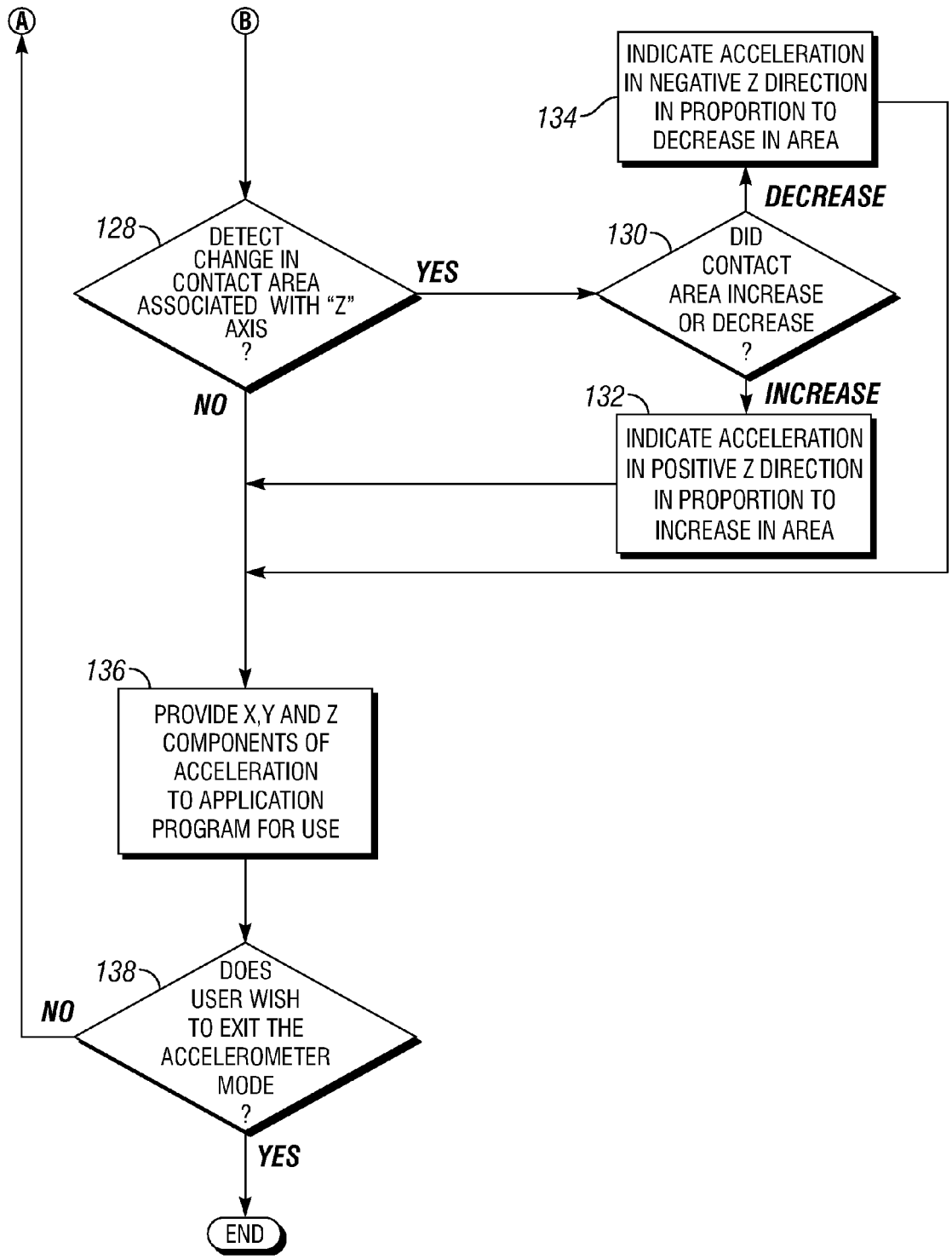

FIGS. 13A-B provide a flow diagram of a method 100 for detecting accelerations that are applied to the accelerometer module. The user may select to enter an accelerometer mode of operation on a touch screen device (step 102), such as by pressing an accelerometer mode icon. When the accelerometer module is physically installed, the touch screen detects contact in certain predetermined regions to indicate that an accelerometer module has been properly coupled relative to the touch screen (step 104). During use of the accelerometer, the method monitors the contact area of the deformable member associated with each of three components of acceleration in a Cartesian coordinate system (step 106).

If a change is detected in the contact area associate with the "X" axis (step 108), then it is determined whether the contact area increased or decreased (step 110). If the contact area increased, then there is an indication of an acceleration in the positive X direction (+X) in an amount that is proportional to the extent of increase in the contact area (step 112). However, if the contact area decreased, then there is an indication of an acceleration in the negative X direction (−X) in an amount that is proportional to the extent of decrease in the contact area (step 114). The function of this proportionality may be stored in the application software.

If a change is detected in the contact area associate with the "Y" axis (step 118), then it is determined whether the contact area increased or decreased (step 120). If the contact area increased, then there is an indication of an acceleration in the positive Y direction (+Y) in an amount that is proportional to the extent of increase in the contact area (step 122). However, if the contact area decreased, then there is an indication of an acceleration in the negative Y direction (−Y) in an amount that is proportional to the extent of decrease in the contact area (step 124). The function of this proportionality may be stored in the application software.

Furthermore, if a change is detected in the contact area associate with the "Z" axis (step 128), then it is determined whether the contact area increased or decreased (step 130). If the contact area increased, then there is an indication of an acceleration in the positive Z direction (+Z) in an amount that is proportional to the extent of increase in the contact area (step 132). However, if the contact area decreased, then there is an indication of an acceleration in the negative Z direction (−Z) in an amount that is proportional to the extent of decrease in the contact area (step 134). The function of this proportionality may be stored in the application software.

Having detected whether there was any acceleration in the X, Y or Z directions, and having determined the extent of the acceleration where detected, the method provides the resulting X, Y and Z components of acceleration to an application program for further use (step 136). If the user wants to exit the accelerometer mode (step 138), then the process ends. Otherwise, the method continues in the accelerometer mode and returns to step 106 to continue monitoring the contact areas on the touch screen. Application programs, such as pedometers or video games, may use the output of the method in a wide variety of ways.

The terms "comprising," "including," and "having," as used in the claims and specification herein, shall be considered as indicating an open group that may include other elements not specified. The terms "a," "an," and the singular forms of words shall be taken to include the plural form of the same words, such that the terms mean that one or more of something is provided. The term "one" or "single" may be used to indicate that one and only one of something is intended. Similarly, other specific integer values, such as "two," may be used when a specific number of things is intended. The terms "preferably," "preferred," "prefer," "optionally," "may," and similar terms are used to indicate that an item, condition or step being referred to is an optional (not required) feature of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method of sensing acceleration, comprising:
disposing a deformable member adjacent a touch screen surface;
directing an acceleration to push the deformable member against the touch screen surface to cause a change in a degree of elastic deformation of the deformable member; and
sensing a change in a contact area between the deformable member and the touch screen surface as a result of the change in the degree of elastic deformation.

2. The method of claim 1, further comprising:
applying a substantially constant biasing force to push the deformable member against the touch screen surface to cause a first extent of elastic deformation of the deformable member; and
directing an acceleration to oppose the substantially constant biasing force and result in a second extent of elastic deformation of the deformable member that is less than the first extent of elastic deformation.

3. The method of claim 2, further comprising:
physically limiting the acceleration that is directed to push the deformable member against the touch screen to be an acceleration along a defined axis; and
identifying the direction of the acceleration along the defined axis by determining whether the contact area increased or decreased.

4. The method of claim 3, further comprising:
identifying the relative magnitude of the acceleration by determining the extent of the change in the contact area.

5. The method of claim 4, wherein the step of identifying the relative magnitude of the acceleration by determining the extent of the change in the contact area, includes using a correlation between contact area and acceleration.

6. The method of claim 5, further comprising:
combining the direction and relative magnitude of the acceleration along each of three coordinate axis in order to determine the direction and relative magnitude of an overall acceleration.

* * * * *